March 20, 1934. D. R. POBJOY 1,951,948
JOINT OR ATTACHMENT OF PARTS IN ENGINES AND THE LIKE
Filed Feb. 9, 1932
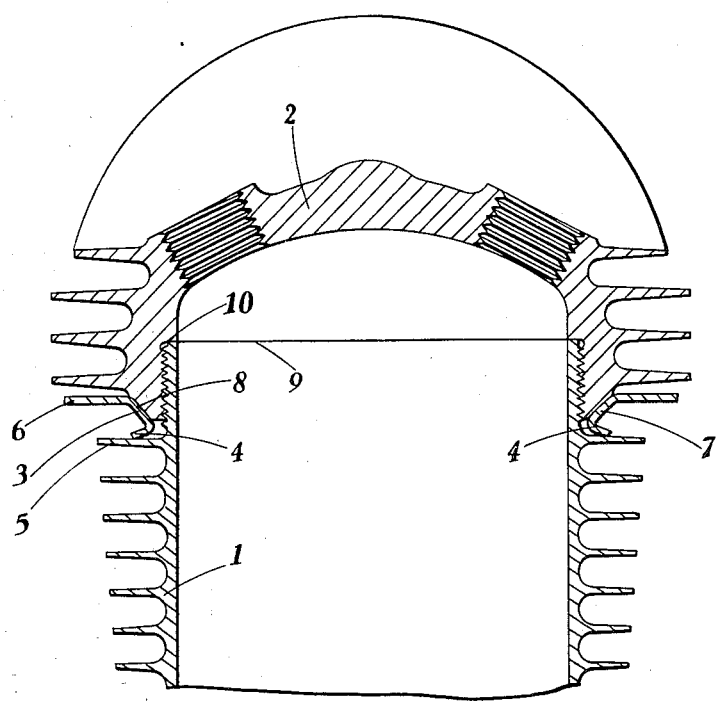
INVENTOR
Douglas R. Pobjoy
BY
Chas. J. Williamson
ATTORNEY Patented Mar. 20, 1934

1,951,948

UNITED STATES PATENT OFFICE 1,951,948

JOINT OR ATTACHMENT OF PARTS IN ENGINES AND THE LIKE

Douglas Rudolf Pobjoy, Hooton, Wirral, England

Application February 9, 1932, Serial No. 591,922
In Great Britain February 23, 1931

1 Claim. (Cl. 285—145)

This invention relates to joints or attachments of parts in engines or the like and particularly to attachments between members subjected to heat and having different coefficients of expansion. Thus though particularly concerning engine parts composed of members united by a joint, the invention broadly relates to and may be embodied in other structures than engine parts where joints exist.

More specifically the invention relates to a locking ring for use in a joint of the above character and particularly for use in the attachment of a steel or iron cylinder barrel to a non-ferrous (e. g. light alloy) cylinder head.

According to the present invention, the externally arranged locking-ring is formed with a flange or part adapted to bear directly on an annular projection on the cylinder barrel, and with a coned body which is adapted to be forced into intimate contact with a correspondingly coned external wall of the cylinder head. The said annular projection may consist of a cooling fin on the cylinder barrel, while the locking-ring itself may be formed with an annular flange at the opposite end of the body acting as a cooling fin.

Where it is essential that the inner end of the cylinder barrel shall be screwed hard into contact with the adjacent end wall of the recess in the cylinder head, the locking-ring is made of such proportions and of such material that the ring is slightly crushed plastically and, at the same time, is elastically compressed, so that a tight-joint is also ensured between the coned faces of the ring and cylinder head. A suitable material for such a ring is mild steel.

The ring may be made more rigid and need not be so accurately dimensioned in a case in which a space may be left between the end of the cylinder barrel and the end wall of the recess in the cylinder head.

A constructional form of the invention is shown, in the accompanying drawing, applied to a steel cylinder barrel 1 which is screwed into a light metal head 2. The locking-ring 3 is made of mild steel, and is formed with an outwardly-projecting flange 4 arranged to bear upon the outermost cooling fin 5 of the barrel. The locking-ring also comprises an outer flange 6, acting as a cooling fin, and an intermediate body portion 7 having a coned interior 8 which is arranged to fit closely around the correspondingly coned external wall of the cylinder head. The dimensions of the ring are such that if it is desired to make a gas-tight joint between the outer end 9 of the cylinder barrel and the adjacent wall 10 of the recess in the cylinder head, the barrel is screwed right home in the recess in the head, the ring being compressed elastically and at the same time slightly crushed. The ring, therefore, takes a permanent set, but still retain sufficient elasticity to ensure that it will exert an elastic pressure over the conical joint. Expressed otherwise, the ring may be regarded as a partly soft washer and partly as a spring washer. The advantage of this construction is that the dimensional accuracy of the ring in the axial direction does not demand the same degree of accuracy as would be the case if the ring could not be crushed plastically.

In the case of some cylinders, it may not be essential for the cylinder barrel to be screwed right home in the recess in the cylinder head or, in other words, a space may be left between the end wall 10 of the recess in the cylinder head and the outermost end 9 of the barrel. In this case, the ring could be made more rigid and would still perform its function of keeping the threaded joint gas-tight.

As an example of the ring referred to in the above description of the first mentioned constructional form of the invention, it may be stated that the ring is one sixteenth of an inch thick while the bore of the cylinder barrel is three inches.

I claim:—

In a structure that includes two cylindrical members threadedly screwed together endwise one into the other and of metal of different coefficients of expansion, and which in use is subjected to high temperatures, such members having spaced apart, opposing surfaces on the exterior, that define an annular packing receiving space, a metallic packing and locking ring situated between and in contact with such surfaces, of a material that permits plastic deformation within the elastic limits of the ring, under pressure from such opposing surfaces, when the members are screwed together, said ring though plastically deformed resiliently contacting such opposing surfaces and preserving gas-tight contact of the interengaging threads of said members, and said ring at one surface-engaging side having a coned outwardly extending flange and the surface engaged thereby being coned, and the ring at the opposite side having an outwardly projecting surface-engaging flange.

DOUGLAS RUDOLF POBJOY.